Figure 1:
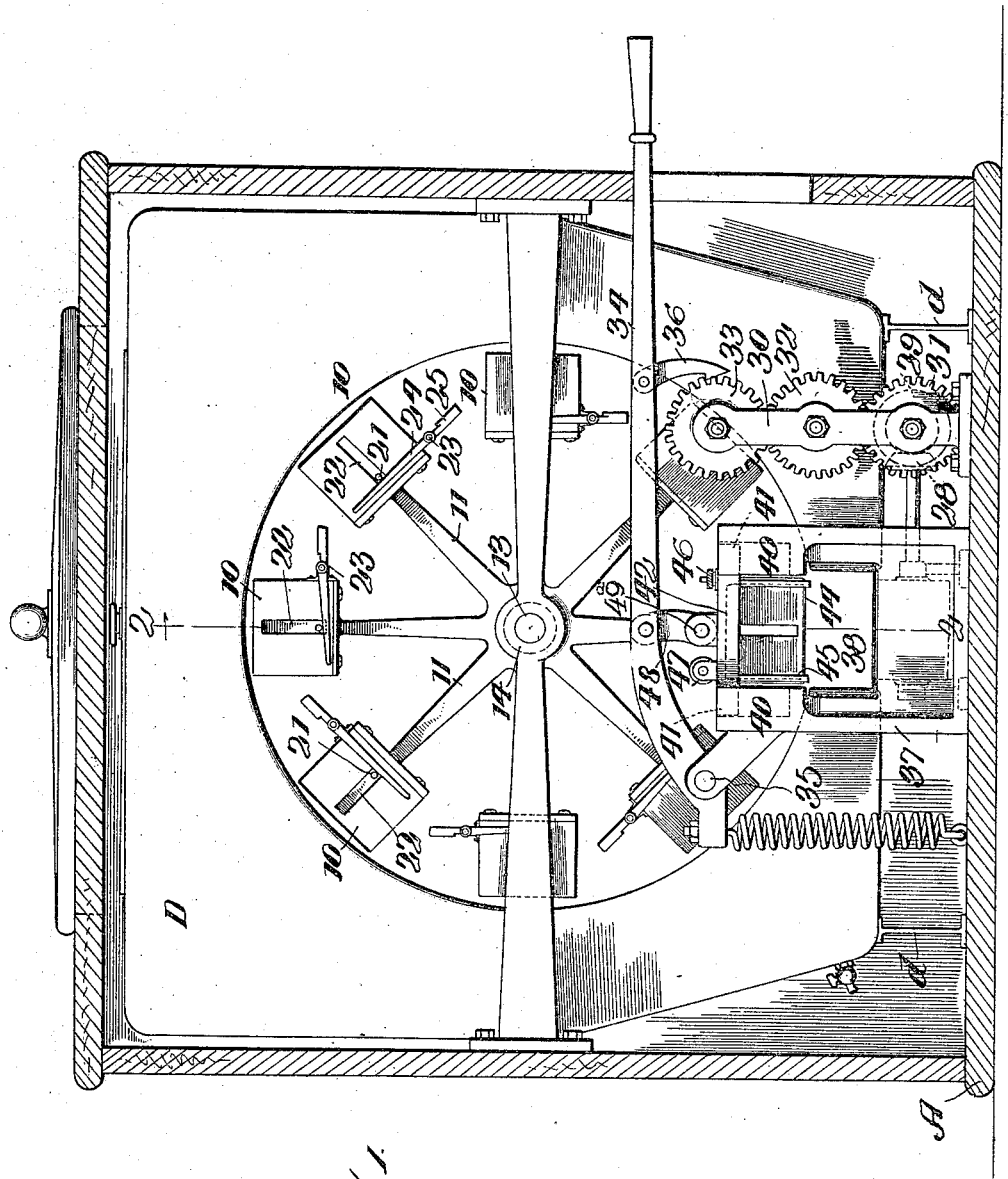

L. A. ROBERTS.
FOOD DISPENSING MACHINE.
APPLICATION FILED DEC. 9, 1915.

1,188,997.

Patented June 27, 1916.
3 SHEETS—SHEET 1.

Witnesses

Inventor
L. A. Roberts
By
Attorney

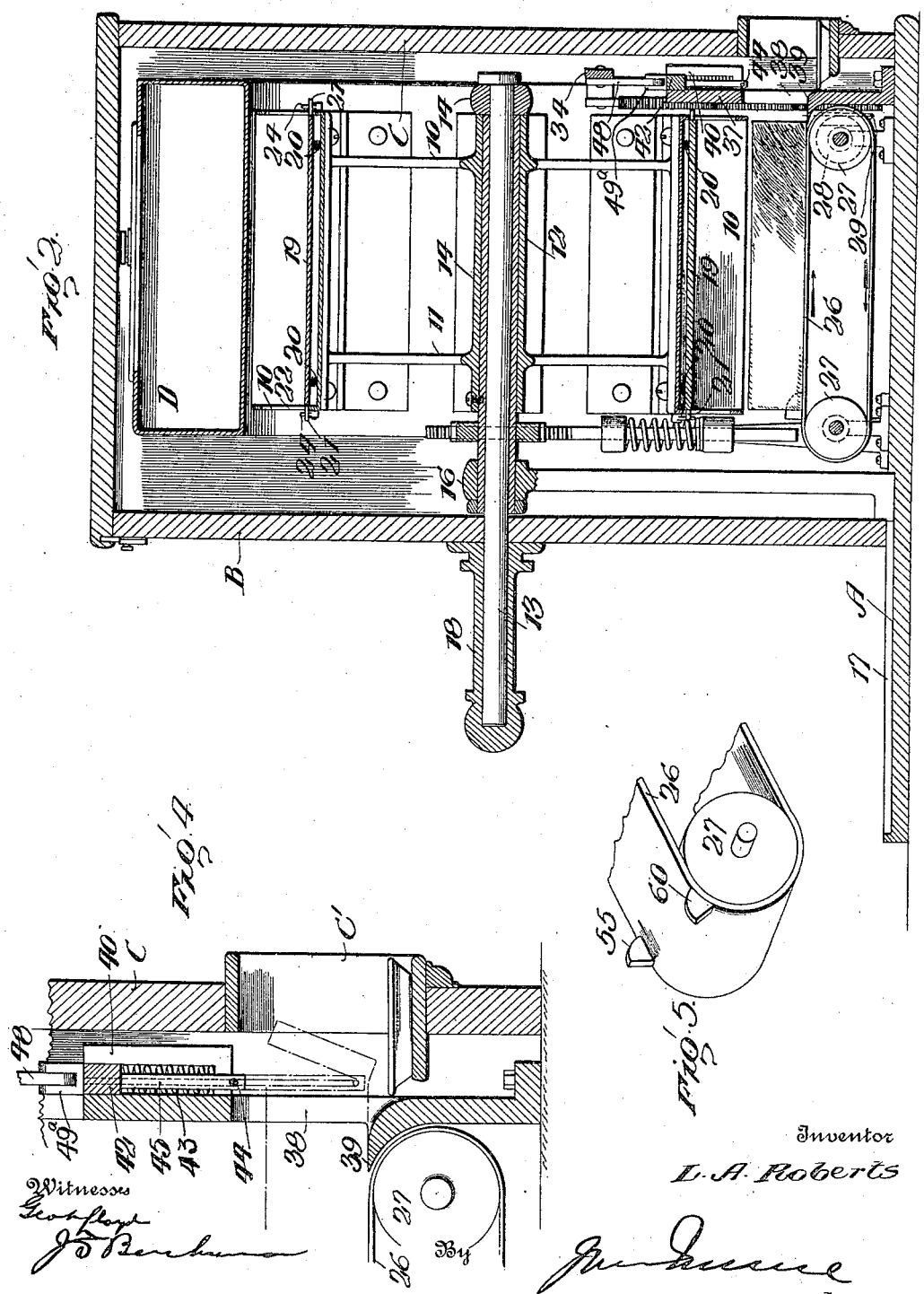

L. A. ROBERTS.
FOOD DISPENSING MACHINE.
APPLICATION FILED DEC. 9, 1915.
1,188,997.
Patented June 27, 1916.
3 SHEETS—SHEET 3.
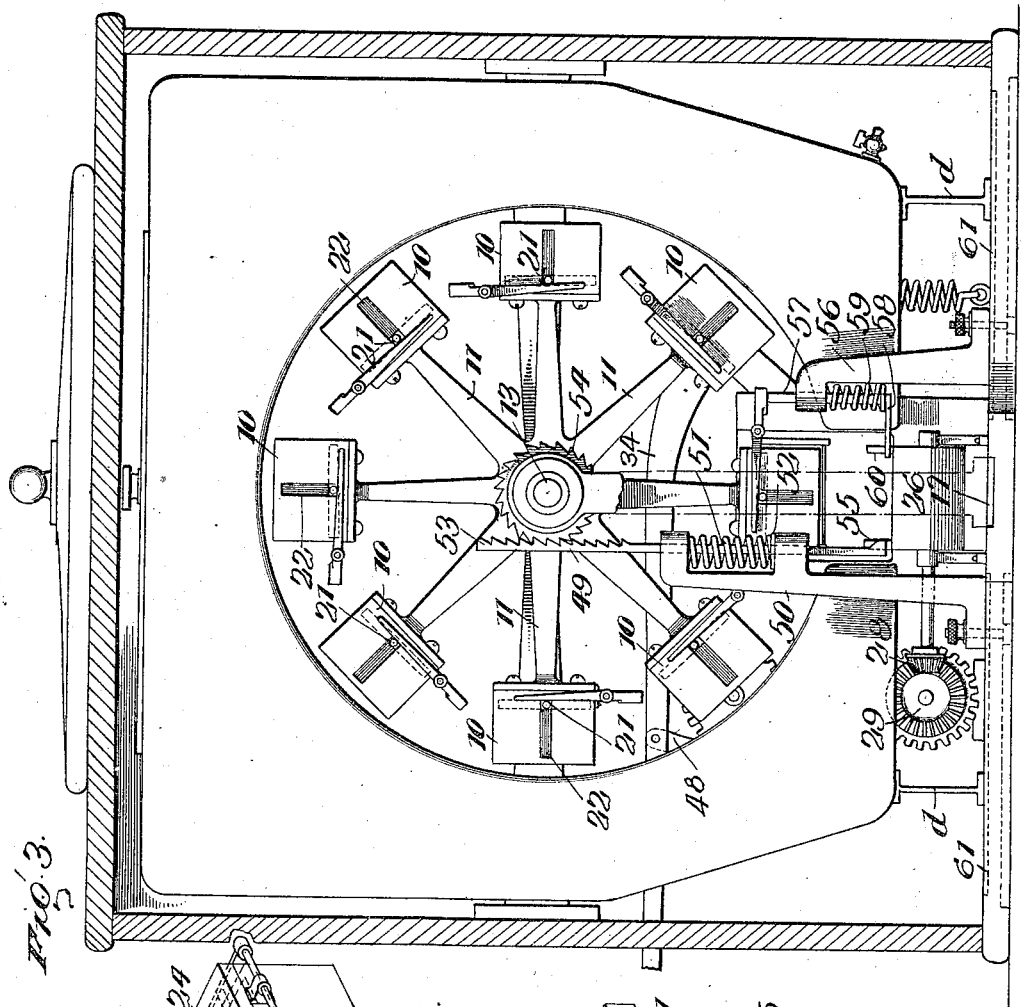
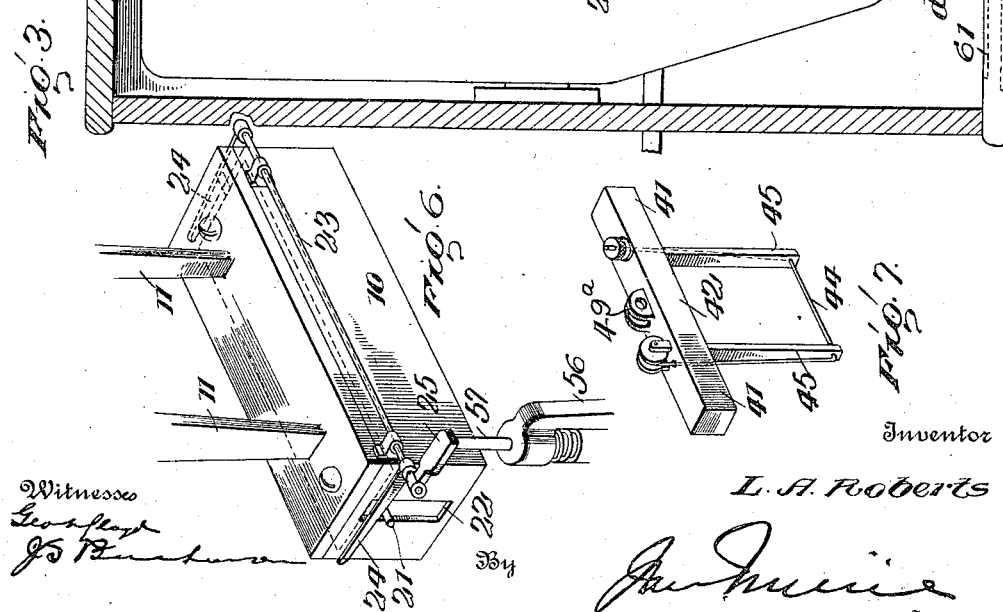

UNITED STATES PATENT OFFICE.

LOUIE A. ROBERTS, OF MERIDIAN, MISSISSIPPI.

FOOD-DISPENSING MACHINE.

1,188,997.　　　　Specification of Letters Patent.　　Patented June 27, 1916.

Application filed December 9, 1915. Serial No. 65,868.

*To all whom it may concern:*

Be it known that I, LOUIE A. ROBERTS, a citizen of the United States, residing at Meridian, in the county of Lauderdale and State of Mississippi, have invented certain new and useful Improvements in Food-Dispensing Machines, of which the following is a specification.

This invention relates to food dispensing machines and has for an object to provide means for keeping the food in as clean and sanitary condition as possible.

Another object is to provide means for refrigerating the food to keep it wholesome.

A still further object is to provide certain mechanism whereby the food is divided into portions for serving without necessitating contact of the hands with the food or other manual handling whatever.

With these and other objects in view my invention consists in the details of construction and arrangement of parts as will be hereinafter set forth and more particularly pointed out in the appended claims.

In the drawings forming a part of this application I have illustrated the preferred embodiment of my invention, in which drawings:

Figure 1 is a view in elevation with the front wall of the casing removed. Fig. 2 is a vertical section taken on the line 2—2 of Fig. 1. Fig. 3 is a view in elevation with the rear wall of the casing removed. Fig. 4 is a detail sectional view taken through the cutting mechanism. Fig. 5 is a detail view of a portion of the belt showing the location of the cams. Fig. 6 is a perspective view of one of the receptacles. Fig. 7 is a detail view of the cutter.

Heretofore where butter was required to be served in large quantities and in portions, as in restaurants and similar places, it was customary to divide the butter into small cakes and place them in a tub containing ice and water. The butter was then taken from the tub by dipping the hands in the water, as a consequence the water was soon polluted and the food rendered unwholesome.

By the use of my invention the butter is kept cool without bringing ice or water into contact with it whatsoever, and with this object in view I have provided a plurality of butter containing receptacles 10, which are mounted upon the extremities of arms 11, formed with a hub portion 12. A horizontal supporting shaft 13 is held in a bearing located at the front of the machine, and a sleeve 14 surrounds the shaft. A rear bearing 16 is provided in which is journaled the rear end of the sleeve 14, said sleeve is fixed to the hub of the receptacle support by a set screw and in this manner the rotation of the receptacle support is effected by rotating the sleeve by means to be presently described. The base of the journal 16 rests in a groove 17, provided in the floor A of a casing. By removing the rear wall B of the casing by means of the handle 18, the bearing 16 may be moved rearwardly, carrying the sleeve 14 and receptacle with it and thereby permitting access to the receptacle to refill the same.

The receptacles 10 are provided with false bottoms 19, held in place by coiled springs 20. Pins 21 are secured at either end of the bottoms 19 and project through slots 22 formed in the end walls of the receptacles. A rod 23 is journaled on one side of the receptacle and is provided at either end with arms 24 which are adapted to engage the pins 21, the rods are in addition provided at their rear ends with arms 25. The receptacles are housed within an ice container D which is provided with a large central opening and supporting legs $d$.

A conveyer belt 26 is mounted to travel on rollers 27 beneath the receptacle and in a direction parallel to their lengths as shown in Fig. 2. The shaft of the front roller is extended and provided at its end with a bevel gear 28 which meshes with a bevel gear 29 mounted for rotation upon a standard 30. A spur gear 31 is fixed to the bevel gear 29, and said gear 31 meshes with an idler 32, which in turn has peripheral contact with a third spur gear 33, gears 32 and 33 being also mounted upon the standard 30. A lever 34, pivoted at 35, is provided with a pawl 36 for engagement with the spur gear 33, whereby the gear 33 is rotated during the upward movement of the lever and the motion of the gear is eventually transmitted to the conveyer belt 26 to move its upper surface intermittently toward the front of the machine.

Cutting mechanism is located at the front of the machine adjacent the end of the conveyer belt and comprises a stationary frame 37 formed with a rectangular opening 38, the frame member being formed with an overhanging lip portion 39, which extends partly over the upper surface of the conveyer and forms a continuation of said surface. The upper portion of the frame 37 is formed at opposite ends with boxings 40, into which are extended the ends 41 of a cutter supporting bar 42. Springs 43 are housed within the boxes and bear with their upper ends against the ends 41 of the cutter support to hold same normally in a raised position.

A cutting wire 44 is stretched between two depending hangers formed on the support 42, one end of the wire being adjustably held in the support by a nut 46, while the other end is wrapped around a take-up device 47. A link 48 forms a connection between ears 49ª on the support 42 and the lever 34. In this manner the cutting wire is given a vertical movement immediately preceding an intermittent movement of the conveyer belt.

At the rear of the machine a ratchet bar 49 is mounted for vertical movement in a standard 50, secured to the floor at one side of the belt. A spring 51 is provided which bears against a washer 52 fixed to the ratchet bar to hold the bar normally in a lowered position. Ratchet teeth 53 on the bar 49 are adapted to engage a wheel 54 which is fixed to the sleeve 14, previously described. A cam 55 is located on one edge of the conveyer belt and is arranged so as to engage during its movement the lower end of the ratchet bar 49, whereby upon engagement of the cam with said bar, the bar is raised and the wheel 54 and sleeve 14 rotated through an angular distance equal to the distance between adjacent receptacles.

A standard 56 is secured to the floor on the side of the belt opposite the standard 50 and supports for vertical movement a reciprocating bar 57 which is formed with a horizontal extension 58. A spring 59 is designed to hold the bar in a normally lowered position. The upper end of the bar is extended so as to be almost within the path of movement of the arms 25 which are arranged at the side of the receptacles. A cam 60 similar to the cam 55 is located on the other edge of the belt and is adapted to engage the extension 58 to raise the bar 57.

Grooves 61 are cut in the floor A to receive the base portions of the standards 50 and 56 so that the standards may be moved away from each other far enough to permit the receptacles to be moved out of the casing for refilling, as previously described.

The operation of the machine is as follows: The lever 34 is oscillated and the conveyer belt thereby actuated until the cam 55 engages the bar 49, whereby the receptacle support is rotated a predetermined distance which brings a receptacle in an inverted position directly over the conveyer belt, a continued oscillation of the lever and a consequent movement of the belt next causes engagement between the cam 60 and the extension 58 and the bar 57 is raised. The arm 25 is then engaged by the bar 57 and the rod 23 is rotated thereby, swinging the arms 24 downward to force the false bottom out of the receptacle and the contents of the receptacle are ejected upon the conveyer belt in the form of an oblong cake of butter. A continued actuation of the lever causes the belt to carry the cake of butter forward over the lip 39 and beneath the cutter, which is continually reciprocating and with each downward movement of the cutter a slice of butter is severed from the cake and falls upon a plate which rests upon a shelf adjacent an opening C' formed in the front wall C of the casing. The thickness of the slice to be cut may be varied by changing the ratio of the gears 31 and 32. The cake of butter will be moved forward and sliced at each reciprocation of the lever and after the entire cake has been served, the cam 55 will again be in a position to strike the bar 49 to rotate the receptacle support and the above described series of operations repeated.

It is quite obvious that while butter has been described as the kind of food intended to be served by this machine, other forms of food which are of a softened consistence may be handled equally as well, as for instance, cheese, lard, etc.

While I have described and illustrated specific parts and mechanisms, I wish it understood that various changes in the design of the parts and substitution of others may be made without departing from the spirit of my invention, or the scope of the claims.

Having thus described my invention, what I claim and desire to secure by Letters Patent, is:—

1. A food dispensing machine including a rotatable element, a plurality of food receptacles mounted on said element, a conveyer, means operated by the conveyer for bringing the receptacles one at a time to a point adjacent the conveyer, means operated by the conveyer for discharging the contents of the receptacle upon the conveyer, a cutter, means for actuating the conveyer to move the discharged contents to a point beneath the cutter, means for actuating the cutter, and a refrigerating element surrounding the receptacle.

2. A food dispensing machine including a rotatable element formed with a plurality of radial arms, a food receptacle at the outer extremity of each arm, a movable bottom within the receptacle, means for moving the movable bottom outwardly to discharge the contents of the receptacle, a conveyer to receive the discharged contents, a cutter and a single means for actuating the conveyer and the food cutter.

3. A food dispensing machine including a rotatable element provided with a plurality of receptacles adapted to rotate therewith, a movable bottom in the receptacle, lugs on the bottom which project out through slots formed in the sides of the receptacle, arms pivoted to the receptacle for engaging the lugs to move the bottom outward for discharging the contents of the receptacle, a conveyer, means for bringing the receptacles one at a time to a position adjacent the conveyer, means for swinging the aforesaid arms when the receptacle has arrived at its aforesaid position, means for actuating the conveyer, a cutter, and means for actuating the same.

4. A food dispensing machine including a rotatable element carrying a plurality of food receptacles, a conveyer, means operated by the conveyer for bringing the receptacles one at a time to a point adjacent the conveyer, means on the conveyer for causing the receptacles to discharge their contents when the receptacles have arrived at their before stated position, means for actuating the conveyer, a cutter, and means for actuating the cutter.

5. A food dispensing machine including a rotatable element carrying a plurality of food receptacles, a movable bottom within the receptacles, means for actuating the bottoms, a conveyer for receiving the contents of the receptacles, a reciprocating rod, one end of which is located adjacent the path of movement of the aforesaid bottom actuating means, a movable support for the rod, a cam on the conveyer for striking the rod to cause engagement between the rod and the bottom actuating means whereby said bottom is moved, means for actuating the conveyer, a cutter, and means for actuating the cutter.

6. A food dispensing machine including a rotatable element supporting a plurality of food receptacles, a sleeve forming the axis of the element, a shaft within the sleeve, a bearing for supporting the shaft, a movable bearing for supporting the sleeve, a ratchet wheel on the sleeve, a reciprocating ratchet bar engaging the wheel, a movable bearing for supporting the bar, a conveyer, means on the conveyer for engaging the ratchet bar to reciprocate the same and cause rotation of the ratchet wheel, sleeve and rotatable element, a cutter, and means for actuating the groove and the cutter.

7. A food dispensing machine including a rotatable element supporting a plurality of food receptacles, a conveyer, means operated by the conveyer for rotating the element supporting the food receptacles, means operated by the conveyer for discharging the contents of the receptacles one at a time upon the conveyer, a cutter, and means for actuating alternately the conveyer and the cutter.

8. A food dispensing machine including a plurality of rotatable food receptacles, a conveyer, means for discharging the receptacle upon the conveyer in the form of a cake, a vertically movable cutter for dividing the cake into smaller portions, means for actuating the conveyer to carry the cake forward, and for subsequently actuating the cutter.

9. A food dispensing machine including the combination of a plurality of movable receptacles, a conveyer for carrying away the discharged contents of the receptacles, a cutter which comprises a vertically movable cutter support, a pair of hangers, a wire stretched taut between the hangers, guides for guiding the cutter and support, resilient means for holding the support in raised position, and means for alternately actuating the cutter and conveyer.

10. A food dispensing machine including in combination a housing, a rotatable element carrying a plurality of food receptacles, means for rotating the element, movable bottoms within the receptacles, a conveyer, means for bringing the receptacles one at a time to a position adjacent the conveyer, means on the conveyer for causing rotation of the element, means on the conveyer for causing movement of the movable bottoms whereby the contents of the receptacles are discharged upon the conveyer, a cutter frame provided with an overhanging portion which forms a continuation of the surface of the conveyer, a vertically movable cutter over said overhanging portion, a lever for reciprocating the cutter, gears forming an operating means for the conveyer, a pawl on the lever for engaging one of the gears to cause rotation, said pawl being adapted to act on said gear at a time when the cutter is moving away from its work, and a refrigerating element surrounding the receptacles.

11. In a food dispensing machine, the combination of a casing, a refrigerator mounted in the casing and provided with a central transverse recess and a bottom slot communicating with the recess, a plurality of food receptacles mounted in the recess, each receptacle having a movable bottom, a transverse conveyer located in the bottom of the slot and adapted to receive the contents of the receptacles, means operated by the conveyer for moving the receptacles over the conveyer, means operated by the conveyer for operating the movable bottoms to inject the food to the conveyer, and means for operating the conveyer.

12. In a food dispensing machine, the combination of a plurality of food receptacles, each of which is provided with a movable bottom, a conveyer, gearing connected with the conveyer, a cutter, manually operated means for rotating the gearing to move the conveyer and simultaneously raising the cutter to cutting position, and means operated after the conveyer starts to move for ejecting food from one of the receptacles to the conveyer.

13. In a food dispensing machine, the combination of a plurality of rotary food receptacles, each of which is provided with a movable bottom, a conveyer having cams, means operated by one of the cams for rotating the food receptacles, means operated by the other cam for actuating the movable bottom in the receptacle located above the conveyer to eject the food, a cutter, and means for operating the cutter and the conveyer.

14. In a food dispensing machine, the combination of a casing, a slidable bearing in the casing, a plurality of rotatable food receptacles supported by the slidable bearing, a conveyer in the casing below the receptacles, a support mounted to slide transverse of the slidable bearing, operating means mounted in the sliding support to effect rotation of the food receptacles, means on the conveyer for actuating said operating means, a support also mounted to slide transverse of the slidable bearing and provided with actuating means for effecting movement of the movable bottoms, means on the conveyer for operating the actuating means, the sliding bearing and supports permitting of the withdrawal of food receptacles from the casing, a cutter, and means for operating the cutter and the conveyer.

15. In a food dispensing machine, the combination of a plurality of arms on each of which is mounted a food receptacle formed in opposite ends with slots, a movable bottom in each receptacle, pins projecting from opposite ends of each movable bottom and extending through the slots, springs for normally holding each bottom in its respective receptacle, a rock shaft on each receptacle, arms extending from each rock shaft and extending over the pins, a lever extending from each rock shaft, a rod located in the path of movement of the lever, a spring for holding said rod in normal position, a conveyer under the receptacles, means on the conveyer for operating the rod to eject food from the receptacle located over the conveyer, means for rotating the receptacles, a cutter, and means for operating the cutter and the conveyer.

In testimony whereof I affix my signature in the presence of two witnesses.

LOUIE A. ROBERTS.

Witnesses:
 GEO. A. FLOYD,
 J. G. BURHAMINSON.

Copies of this patent may be obtained for five cents each, by addressing the "Commissioner of Patents, Washington, D. C."